United States Patent
Chalmer et al.

(10) Patent No.: US 10,645,603 B2
(45) Date of Patent: May 5, 2020

(54) PORTABLE AUTONOMOUS VEHICLE CONNECTIVITY PLATFORM

(71) Applicant: Wing Aviation LLC, Mountain View, CA (US)

(72) Inventors: Jeremy Chalmer, Redwood City, CA (US); Jason Hilton, Mountain View, CA (US); Jason Minahan, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 181 days.

(21) Appl. No.: 15/918,554

(22) Filed: Mar. 12, 2018

(65) Prior Publication Data

US 2019/0281483 A1    Sep. 12, 2019

(51) Int. Cl.
*H04W 24/10* (2009.01)
*G08G 5/00* (2006.01)
(Continued)

(52) U.S. Cl.
CPC .......... *H04W 24/10* (2013.01); *G08G 5/0004* (2013.01); *G08G 5/0013* (2013.01); *G08G 5/0026* (2013.01); *G08G 5/0034* (2013.01); *G08G 5/0069* (2013.01); *H04B 7/18504* (2013.01); *H04W 76/10* (2018.02); *H04W 84/005* (2013.01); *H04W 88/08* (2013.01); *B64C 39/024* (2013.01);
(Continued)

(58) Field of Classification Search
CPC ............. H04B 7/18504; G08G 5/0069; G08G 5/0013; H04W 24/10
See application file for complete search history.

(56) References Cited

U.S. PATENT DOCUMENTS 8,096,254 B1 * 1/2012 Bauer .................... B63B 7/082
                                                        114/259
9,466,219 B1   10/2016 Stefani et al.
(Continued)

FOREIGN PATENT DOCUMENTS

| CN | 203480249 U | 3/2014 |
|----|-------------|--------|
| EP | 2 138 921 A2 | 12/2009 |
| WO | 2016/130716 A2 | 8/2016 |

OTHER PUBLICATIONS

MAX Multi-Cellular Router, Peplink, <https://peplink.com/products/max-cellular-router/multi-cellular/>, retrieved from Internet Jan. 16, 2018, 8 pages.

(Continued)

*Primary Examiner* — Ashley Shivers
(74) *Attorney, Agent, or Firm* — Christensen O'Connor Johnson Kindness PLLC

(57) ABSTRACT

A portable autonomous vehicle connectivity platform includes a portable case, a local area network (LAN) side adapter, a wide area network (WAN) side adapter, a gateway router, and a controller. The LAN side adapter is communicates with autonomous vehicles (AVs). The WAN side adapter communicates with a remote server. The gateway router bridges communications between the LAN side adapter and the WAN side adapter. The controller is coupled to the gateway router for caching mission log reports received from the AVs and transmitting the mission log reports to the remote server.

23 Claims, 9 Drawing Sheets

(51) Int. Cl.
  *H04B 7/185*   (2006.01)
  *H04W 76/10*   (2018.01)
  *H04W 88/08*   (2009.01)
  *H04W 84/00*   (2009.01)
  *H04W 84/12*   (2009.01)
  *B64C 39/02*   (2006.01)

(52) U.S. Cl.
  CPC ...... *B64C 2201/00* (2013.01); *B64C 2201/12* (2013.01); *B64C 2201/146* (2013.01); *H04W 84/12* (2013.01)

(56) References Cited

U.S. PATENT DOCUMENTS

| | | |
|---|---|---|
| 9,569,587 B2 | 2/2017 | Ansari et al. |
| 2004/0085944 A1 | 5/2004 | Boehm |
| 2012/0035787 A1 | 2/2012 | Dunkelberger et al. |
| 2016/0045381 A1* | 2/2016 | Spence .................. A61F 17/00 |
| | | 206/570 |
| 2016/0241623 A1 | 8/2016 | Zoulias et al. |
| 2017/0026231 A1 | 1/2017 | Poosala et al. |
| 2019/0338885 A1* | 11/2019 | Hu .......................... B64C 27/08 |

OTHER PUBLICATIONS

International Search Report and Written Opinion dated Jun. 5, 2019, issued in corresponding International Application No. PCT/US2019/021198, filed Mar. 7, 2019, 16 pages.

* cited by examiner

PORTABLE AUTONOMOUS VEHICLE CONNECTIVITY PLATFORM

TECHNICAL FIELD

This disclosure relates generally to autonomous vehicles, and in particular but not exclusively, relates to deployment connectivity for autonomous vehicles.

BACKGROUND INFORMATION

An unmanned vehicle, which may also be referred to as an autonomous vehicle (AV), is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, on or under the water, and in space. Unmanned aerial vehicles (UAVs) are becoming more popular in general. They are being deployed in a variety of different field settings including urban, suburban, and rural environments. The wide variety of deployment environments creates a challenge for providing the connectivity infrastructure that these AVs often rely upon. AV connectivity for long term, or even short term, deployments can require access to backend resources provided by a remote server, cloud services, or command terminal. It is desirable for these backend resources to be available in the full variety of field settings with minimal setup and teardown effort.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
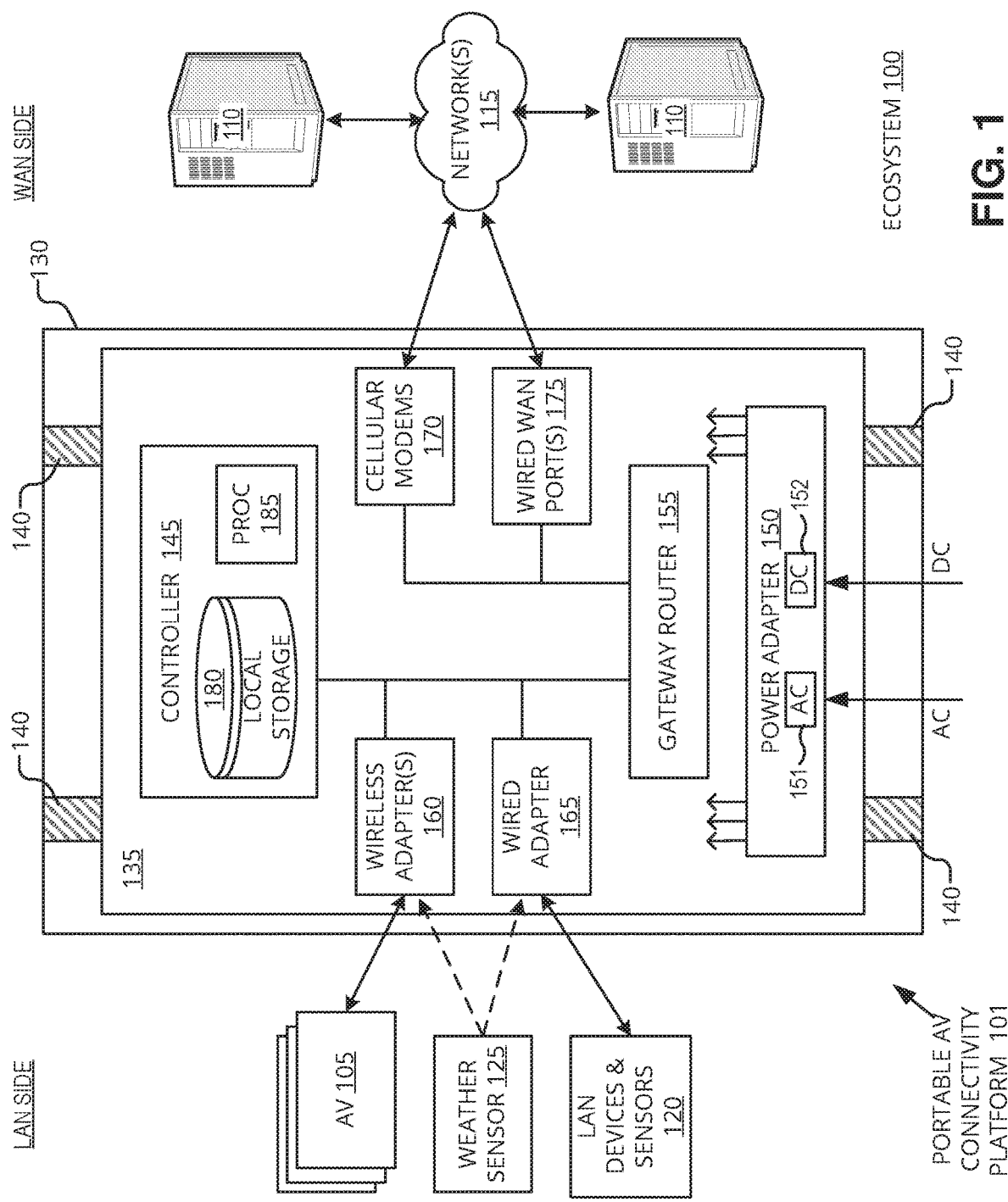
FIG. 1 is an illustration of an autonomous vehicle (AV) ecosystem for using a portable AV connectivity platform (PAVCP) that links field deployed AVs to backend remote servers, in accordance with an embodiment of the disclosure.

Embodiments of a system, apparatus, and method of operation for a portable autonomous vehicle connectivity platform (PAVCP) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The operation of autonomous vehicles (AVs) can require a variety of connectivity infrastructure to achieve full operational support. The connectivity infrastructure may include access to backend resources that can consume significant backhaul throughput. Correspondingly, the local deployed equipment may require local connectivity between the AVs, local sensors (e.g., weather station), local operator terminal or other equipment. Maintaining adequate connectivity infrastructure to AVs across a large spectrum of deployment environments can be challenging.

Accordingly, embodiments of a portable autonomous vehicle connectivity platform (PAVCP) described herein provide full featured portable connectivity infrastructure for remote deployments in a variety of environments. The PAVCP provides wired and/or wireless local area network (LAN) connectivity for deployed devices along with wired and/or wireless wide area network (WAN) connectivity for backend connections. Although embodiments described herein can provide significant broadband backhaul throughput, local storage (e.g., gigabyte, terabyte, or more) solutions are also provided with the PAVCP to provide rapid data offloading, caching, and time shifted transmission to the backend resources. For example, embodiments of the PAVCP described herein can quickly download mission log reports from the AVs and subsequently upload those large files to cloud data storage services. The PAVCP also provides connectivity for local environment monitoring, along with remote configuration, monitoring, management, and support of the deployed AVs and supporting equipment. In various embodiments, these connectivity services are integrated into a rugged, portable form factor that provides quick setup and teardown with flexible powering and data connectivity options to accommodate a wide variety of deployment environments.

FIG. 1 is an illustration of an AV ecosystem 100 in which a PAVCP 101 links field deployed AVs 105 to backend resources including remote servers 110, in accordance with an embodiment of the disclosure. The illustrated embodiment of AV ecosystem 100 includes PAVCP 101, AVs 105, servers 110, wide area network (WAN) side networks 115, local area network (LAN) devices and sensors 120, and a weather sensor 125. The illustrated embodiment of PAVCP 101 includes a portable case 130, an internal chassis 135, shock isolators 140, a controller 145, a power adapter 150, a gateway router 155, wireless adapter(s) 160, a wired adapter 165, cellular modems 170, and wired WAN ports 175. The illustrated embodiment of controller 145 includes local storage 180 and processor(s) 185.

Figure 4A:
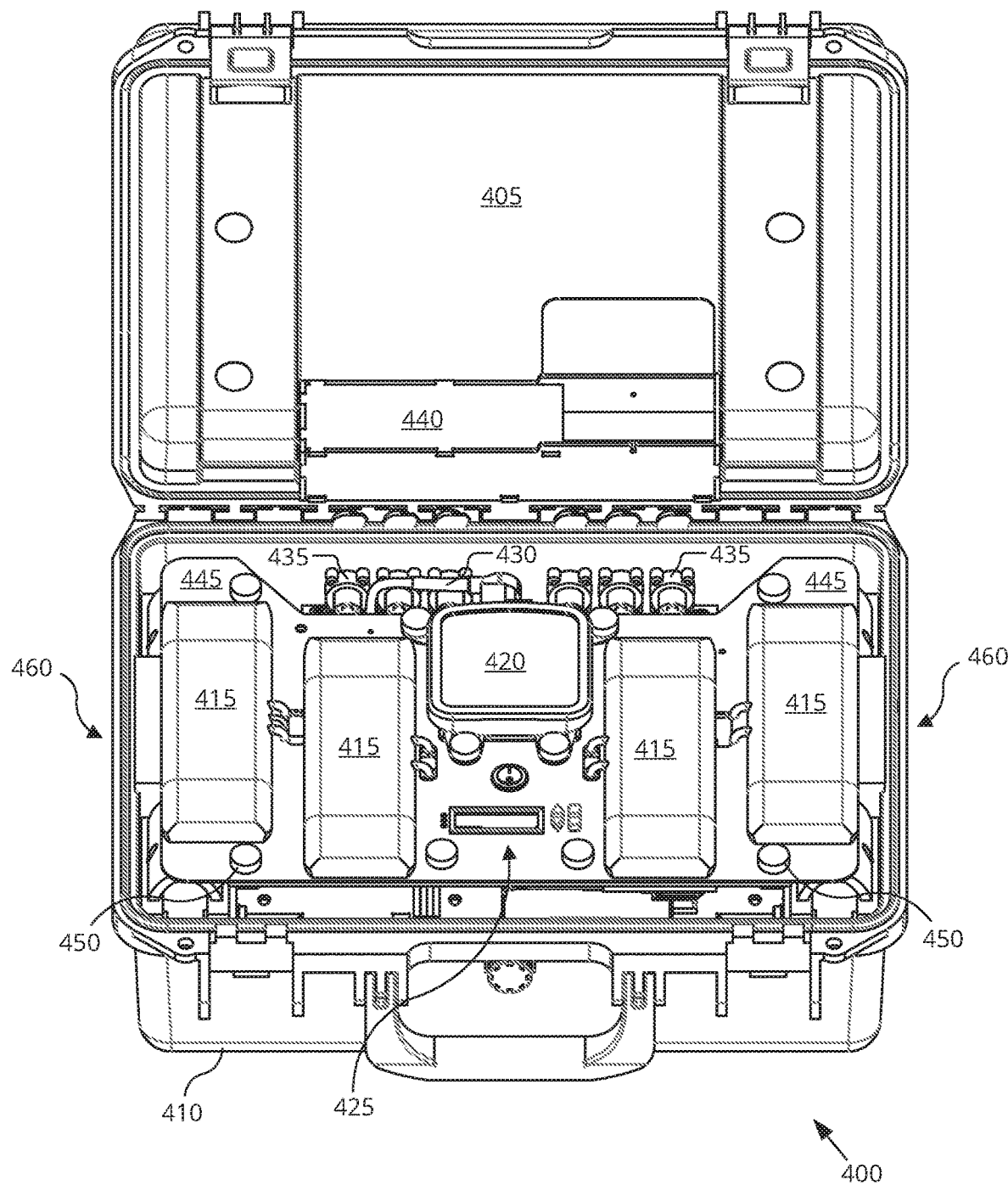
FIG. 4A is a perspective view illustration of the PAVCP with an open lid, in accordance with an embodiment of the disclosure.
Figure 4B:
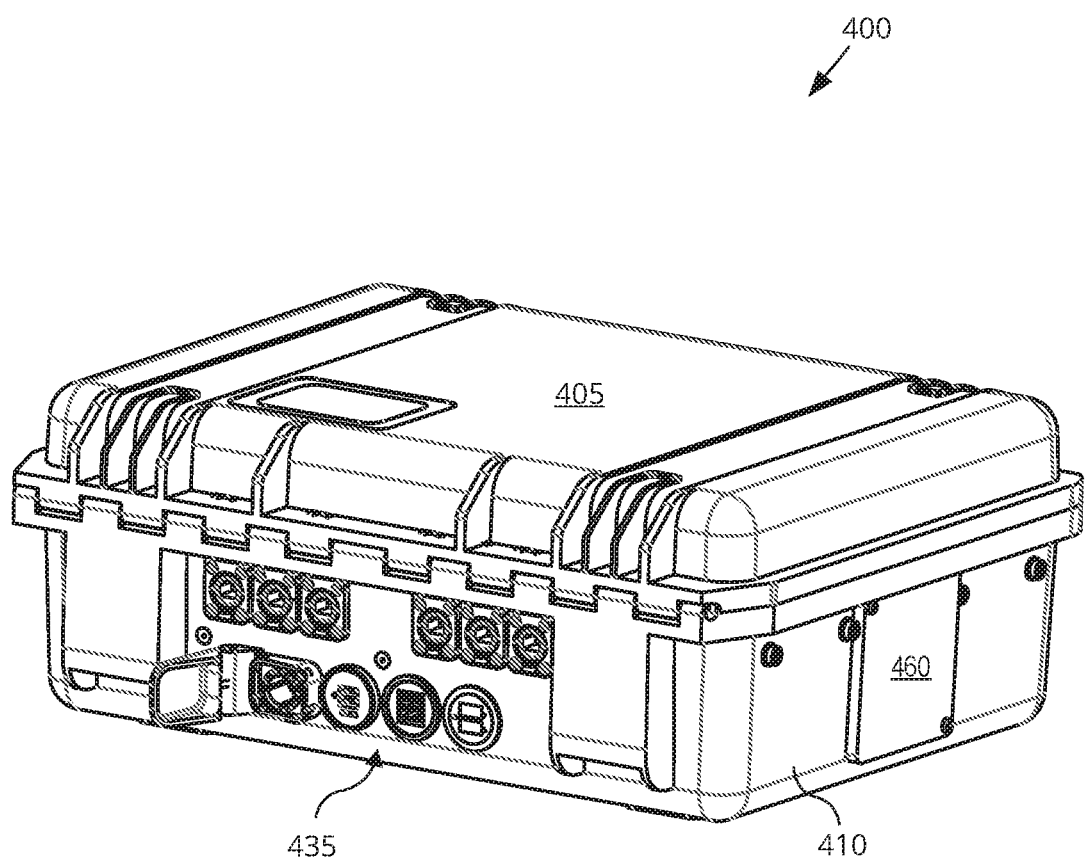
FIG. 4B is a perspective view illustration of a rear of the PAVCP with a closed lid, in accordance with an embodiment of the disclosure.

PAVCP 101 is designed to have a rugged and portable form factor that can be easily and safely transported to various locations to provide connectivity to AVs 105 even in remote deployment locations. Accordingly, PAVCP 101 includes a portable case 130 that protects the internal components (e.g., gateway router 155, power adapter 150, controller 145, wireless adapters 160, wired adapter 165, cellular modems 170, wired WAN ports 175, etc.). FIGS. 4A and 4B (discussed in detail below) illustrate an example form factor for portable case 130 that includes a ruggedized and weather-resistant case with a lid. Of course, other form factors may be implemented.

Figure 5A:
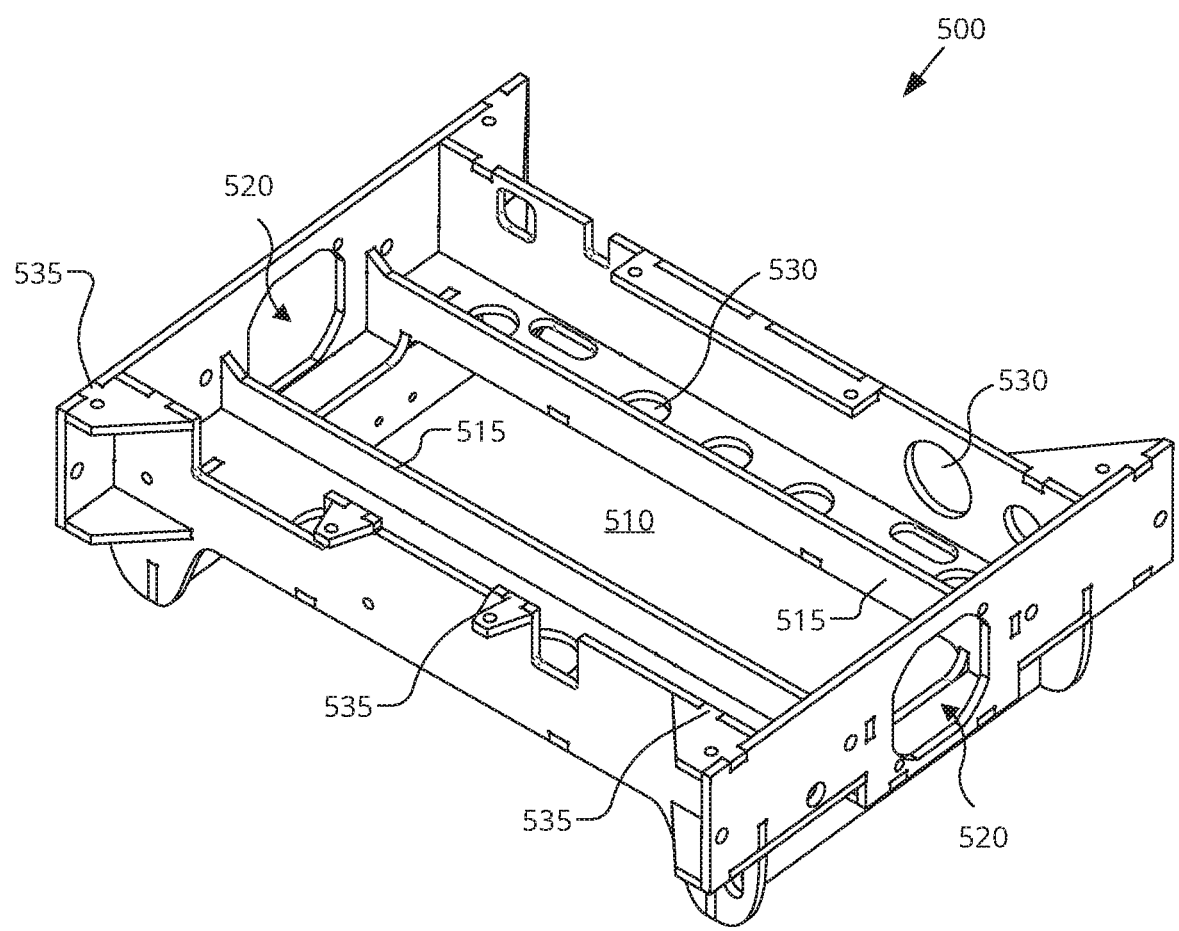
FIG. 5A is a perspective view illustration of an internal chassis for mounting internal components within the portable case of the PAVCP, in accordance with an embodiment of the disclosure.
Figure 5B:
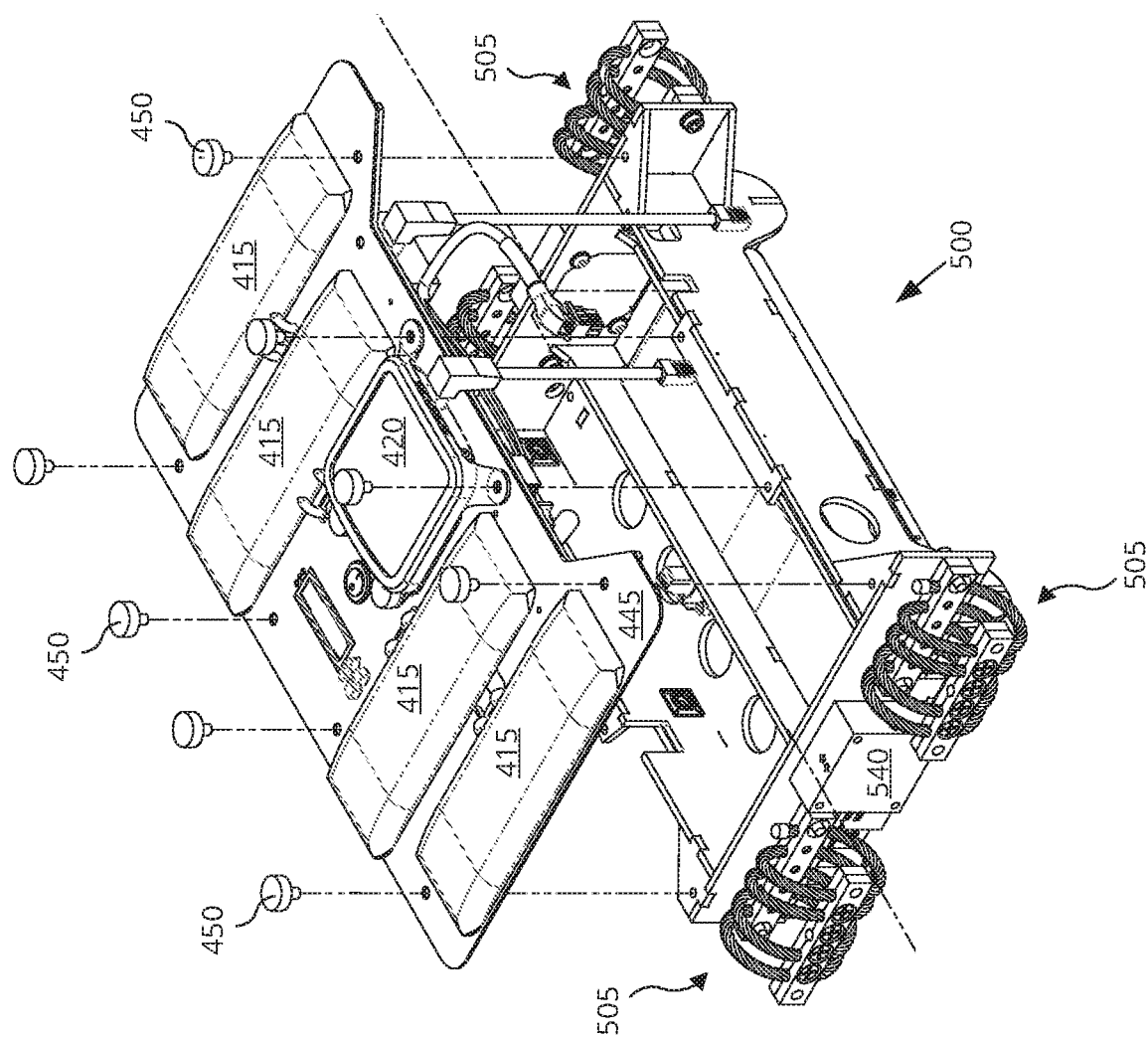
FIG. 5B is an exploded perspective view illustration of top side components mounted to the internal chassis, in accordance with an embodiment of the disclosure.

In one embodiment, the internal components are mounted on internal chassis 135, which is in turn suspended within portable case 130 by shock isolators 140. Shock isolators 140 are mounted between inside surfaces of portable case 130 and internal chassis 135 to provide mechanical shock absorption to protect the internal components in the event portable case 130 is dropped or otherwise impacted. In one embodiment, no rigid connections are formed between the internal components mounted on internal chassis 135 and external ports of portable case 130. Rather, all power and communication connections to the internal components are made via flexible cables. In the illustrated embodiment, four instances of shock isolators 140 are each coupled to respective corner regions of internal chassis 135 to suspend internal chassis 135. FIGS. 5A, 5B, and 5D (discussed in detail below) illustrate one possible implementation of internal chassis 135 and shock isolators 140. Of course, other shock isolating mechanisms may be implemented.

Gateway router 155 is included within portable case 130 and operates to bridge communications between the WAN side adapters and the LAN side adapters, as well as, between the WAN/LAN side adapters and controller 145. The WAN side adapters may include cellular modems 170, wired WAN ports 175, or other communication technologies including a WiFi client or otherwise (not illustrated). The LAN side adapters may include wireless adapters 160 and wired adapter 165. In one embodiment, gateway router 155 is additionally capable of bandwidth aggregation and failover support between the various WAN side adapters. For example, PAVCP 101 may include multiple cellular modems 170 (e.g., two, four, or more) and gateway router 155 may be configured to aggregate the bandwidth across these multiple independent cellular connections to provide broadband backhaul throughput to remote servers 110 over networks 115. In one embodiment, gateway router 155 is further capable of aggregating the bandwidth of cellular modems 170 and wired WAN port(s) 175. WAN port(s) 175 may provide a local wired internet service provider (ISP) connection. Networks 115 represent any number of networks (e.g., the Internet) or intermediary networks (e.g., cellular networks, metro area networks, etc.) that are used on the WAN side to connect with one or more remote servers 110. For example, gateway router 155 may be implemented with either the Peplink MAX HD2 or Peplink MAX HD4 routers.

The illustrated embodiment of PAVCP 101 includes both wireless and wired LAN side adapters for connecting to AVs 105, a weather sensor 125 of a local weather station, and/or various other LAN devices and sensors 120. Wireless adapters 160 may include a WiFi access point (e.g., 802.11ac/g/n WLAN) for high speed data transfer and an additional wireless adapter (e.g., 802.15.4 transceiver) that has lower power consumption and lower bandwidth than the WiFi transceiver for connecting to weather sensor 125. Of course, other wireless transceivers may be implemented. Wired adapter 165 may be included as a wired Ethernet LAN switch, USB hub, and/or otherwise to provide wired connections. In one embodiment, wired adapter 165 is a powered wired LAN adapter (e.g., power over Ethernet switch) that is capable of powering one or more of LAN devices and sensors 120, since they may be deployed in remote field locations without independent power sources. In one embodiment, all instances of PAVCPs 101 deployed in a particular region (e.g., North America), or even deployed worldwide, are assigned a common SSID network name to one of their LAN side wireless adapters 160 to ensure AVs 105 are always able to identify and connect to a deployed PAVCP 101.

Controller 145 is included on internal chassis 135 to choreograph the operation of PAVCP 101 and the other internal components. Controller 145 includes local storage 180 and processor 185 coupled to gateway router 155. Local storage 180 stores data (e.g., mission log reports from AVs 105, analytics data, mission planning data, etc.) and application instructions executed by processor 185. Local storage 180 may be implemented as one or more physical memory units, such as hard disk drives, flash memory, or otherwise. Processor 185 may be implemented as one or more general purpose microprocessors. External storage may also be coupled to controller 145 via wired adapter 165 (e.g., USB port, etc.).

The illustrated embodiment of PAVCP 101 includes a power adapter 150 for powering the internal components of PAVCP 101. The illustrated embodiment of power adapter 150 includes both an alternating current (AC) power regulator 151 and a direct current (DC) power regulator 152. As such, power adapter 150 is capable of powering PAVCP 101 from external sources of either AC or DC power. In one embodiment, power adapter 150 may be plugged into one of AVs 105 (or other portable batteries) and powered from the internal battery of the AV 105.

Figure 2:
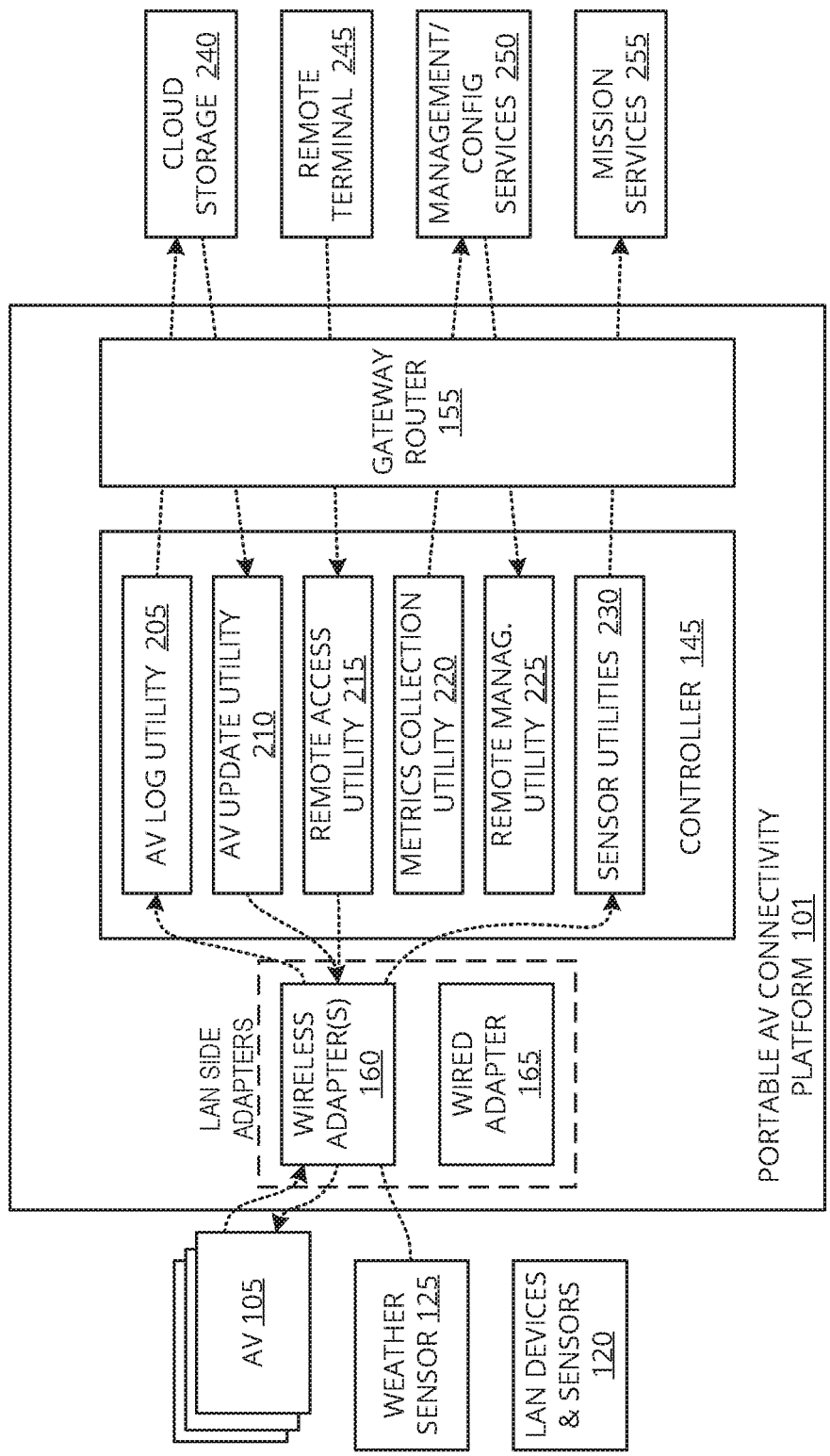
FIG. 2 is a functional block diagram illustrating various functional components of the AV ecosystem including software utilities installed on the PAVCP, in accordance with an embodiment of the disclosure.

FIG. 2 is a functional block diagram illustrating various functional components of AV ecosystem 100 including software utilities installed on PAVCP 101, in accordance with an embodiment of the disclosure. For example, the illustrated embodiment of controller 145 includes an AV log utility 205, an AV update utility 210, a remote access utility 215, a metrics collection utility 220, a remote management utility 225, and a sensor utility 230 installed on local storage 180 for execution by processor 185. Correspondingly, cloud storage 240, remote terminal 245, management/configuration services 250, and mission services 255 are all provided as remote services installed across one or more of remote servers 110. Note, the WAN side adapters are not illustrated in FIG. 2 so as not to clutter the drawing.

AV log utility 205 is executed by controller 145 to manage the downloading, caching, and uploading of mission log reports. During operation, AV log utility 205 automatically receives the mission log reports from AVs 105 upon returning from a mission and establishing a communication session with PAVCP 101 over a wireless adapter 160 (e.g., WiFi connection) or wired adapter 165. The mission log reports include mission data acquired by AVs 105 during their missions. In the case of UAVs, the mission log reports may include sensor data (e.g., GPS tracking data), image data, communication logs, telemetry data, or otherwise related to the recently completed flight mission. Once downloaded, the mission log reports are temporarily cached within local storage 180 while AV log utility 205 uploads each mission log report to cloud storage 240. As mentioned above, gateway router 155 may aggregate available bandwidth over the WAN side adapters to achieve reliable, broadband backhaul throughput to cloud storage 240.

AV update utility 210 is a local utility installed on PAVCP 101 that manages the connectivity for transferring mission planning data and/or other updates from cloud storage 240 installed on a remote server 110 to AVs 105. Mission planning data may include new mission routes, activities, and other mission execution commands/data for execution or reference by AVs 105 during a new mission. In one embodiment, the mission planning data is transferred directly to AVs 105 through PAVCP 101. In other embodiments, the mission planning data is cached locally on local storage 180 and AV update utility 210 establishes a communication session with one or more AVs 105 over a LAN side adapter, and uploads the mission planning data into the connected AVs 105. Accordingly, AV update utility 210 may oversee the local distribution of mission planning data from remote server(s) 110 to AVs 105. In one embodiment, AV update utility 210 further supports local caching of various other types of over-the-air (OTA) updates to be loaded onto AVs 105 at a later time.

Remote access utility 215 is a utility that enables an operator at a remote terminal 245 (e.g., remote terminal installed on a remote server 110) to access AVs 105 in real-time. Remote access utility 215 facilitates secure encrypted communication sessions (e.g., encrypted VPN tunnels, SSH tunnels, etc.) between remote terminal 245 and AVs 105. These remote management connections between AVs 105 and remote terminal 245 can be used to convey real-time configuration commands and response confirmations for remote operator configurations, servicing, troubleshooting, programming, real-time remote engineering support, etc. of AVs 105.

Metrics collection utility 220 is executed by controller 145 to monitor and track the operation of AV log utility 205 and AV update utility 210. For example, in one embodiment, metrics collection utility 220 generates analytics data measuring the accumulation rate of mission log reports, the storage occupancy of the mission log reports, and/or the offload rate of the mission log reports from local storage 180. In some cases, AVs 105 may accumulate large sums of data during each mission. As such, monitoring the downloading, caching, and uploading of this data can become an important task in order to provide timely remote oversight and monitoring of AVs 105. Overseeing availability of resources to cache and upload these mission log report is also important, in order to take timely remedial measures if mission log reports accumulate in local storage 180 quicker than they can be uploaded to cloud storage 240. Metrics collection utility 220 is also responsible for reporting this analytics data over the WAN side adapters to management/configuration services 250 installed on a remote server 110.

Remote management utility 225 is installed on PAVCP 101 to provide remote management, servicing, troubleshooting, remote engineering support, and/or configuration of PAVCP 101 itself. In one embodiment, secure encrypted communications are also supported by remote management utility 225.

Sensor utilities 230 are executed by controller 145 to acquire, cache, and/or stream real-time or historical sensor data from one or more local sensors to mission services 255. For example, in one embodiment, sensor utilities 230 stream weather data from a local weather station including weather sensor 125 for publishing by mission services 255. In one embodiment, LAN devices and sensors 120 include an Automatic Dependent Surveillance-Broadcast (ADS-B) receiver and the manned aircraft broadcasts are streamed to mission services 255. In yet another embodiment, LAN devices and sensors 120 include an Automatic Identification System (AIS) receiver for streaming vessel traffic services to mission services 255 in embodiments where AVs 105 are unmanned watercraft. The sensor data streamed to mission services 255 can be amalgamated with sensor data received from many deployed instances of PAVCPs 101 for generating regional databases of real-time data. In one embodiment, PAVCP 101 may include a GPS receiver and sensor utilities 230 may alos include a location utility that reports location data back to a remote server 110 in real-time. This location data can be combined with the weather data from weather sensor 125 to provide localization of the weather data. Additionally, the location data may be used with geofence operations to issue alarms or reports at a remote server 110 when PAVCP 101 is moved.

Figure 3:
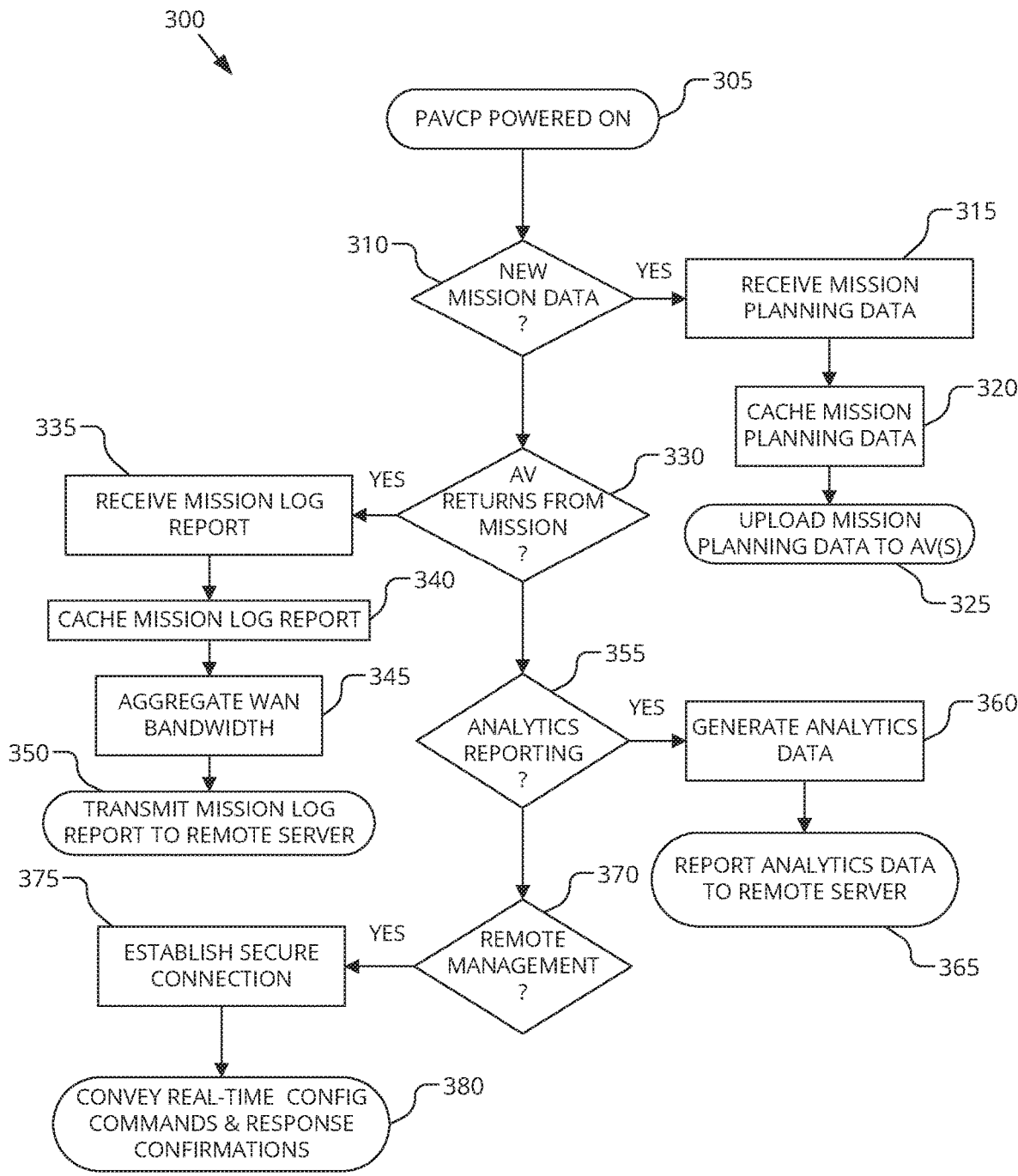
FIG. 3 is a flow chart illustrating a process of operation of the PAVCP, in accordance with an embodiment of the disclosure.

FIG. 3 is a flow chart illustrating a process 300 for operation of the PAVCP 101, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, PAVCP 101 is powered on. Power may be obtained from AC or DC external sources. In one embodiment, DC power regulator 152 is capable of drawing power from 12V or 24V sources.

In a decision block 310, AV update utility 210 connects to a remote server 110 to determine whether new mission planning data is available, and if so, downloads the new mission planning data from cloud storage 240 (process block 315), caches the new mission planned data into local storage 180 (process block 320), and subsequently uploads the new mission planning data to AVs 105 (process block 325). In yet other embodiments, new mission planning data is transferred directly from cloud storage 240 to AVs 105 merely using PAVCP 101 for connectivity. Accordingly, in these embodiments, the mission planning data is not cached and process block 320 is omitted.

In a decision block 330, upon returning from a mission the returning AV 105 connects to PAVCP 101, and AV log utility 205 receives a mission log report over a LAN side adapter (process block 335) from the returning AV 105. AV log utility 205 caches the mission log report into local storage 180 (process block 340). Once downloaded, gateway router 155 can aggregate the WAN side bandwidth for broadband backhaul throughput (process block 345) and AV log utility 205 uploads the mission log report to cloud storage 240 on a remote server 110 (process block 350).

If metrics collection is enabled (decision block 355), then metrics collection utility 220 acquires or otherwise generates analytics data from the local processes and data within PAVCP 101 (process block 360). Subsequently, the analytics data is reported over WAN side adapters to management/configuration services 250 executing on a remote server 110 (process block 365).

When remote management of an AV 105 is desired (decision block 370), a secure tunnel is established by remote access utility 215 between the AV 105 and remote terminal 245 (process block 375). For example, the secure tunnel may use a secure shell (SHH) secure channel to convey real-time configuration commands to AV 105 and deliver response confirmations back to remote terminal 245 (process block 380).

FIGS. 4A & 4B are perspective view illustrations of a PAVCP 400, in accordance with an embodiment of the disclosure. PAVCP 400 is one possible implementation of PAVCP 101. FIG. 4A illustrates a front, topside of PAVCP 400 with a lid 405 of its portable case 410 open, while FIG. 4B illustrates a backside of PAVCP 400 with lid 405 closed.

As illustrated, portable case 410 is a ruggedized, weather-resistant case that protects the internal components of PAVCP 400. These internal components include cellular modems and antennae 415 (WAN side adapters), a wireless access point and/or client 420 (LAN side and/or WAN side adapter), a user control panel 425, and flexible cabling 430 for coupling the internal components to external ports 435 on the backside of portable case 410. The illustrated embodiment of lid 405 further includes a cable management tray 440 mounted on the inside of lid 405. Cable management tray 440 is sized to stow power/communication cords for PAVCP 400. Cable management tray 440 aligns with a cutout in carriage lid 445, to which many of the internal components mount. Carriage lid 445 in turn mounts to a suspended internal chassis (see FIGS. 5A & 5B) with thumb screws 450. Cable management tray 440 prevents the power/communication cords from interfering with the suspension travel of the internal chassis thereby protecting the internal components.

It should be appreciated that in some embodiments, portable case 410 may be larger and assume a variety of other shapes to accommodate additional/larger internal components. For example, in one embodiment, portable case 410 may be large enough to house an on-board battery to provide backup power for a limited period of time (e.g., several hours) in the event external power is unavailable. In larger embodiments, portable case 410 may include wheels to ease transport. In one embodiment, external ports 435 may include external RF connectors for attaching external anntennas or attaching long runs of coaxial cables to provide flexible field setups.

Figure 5C:
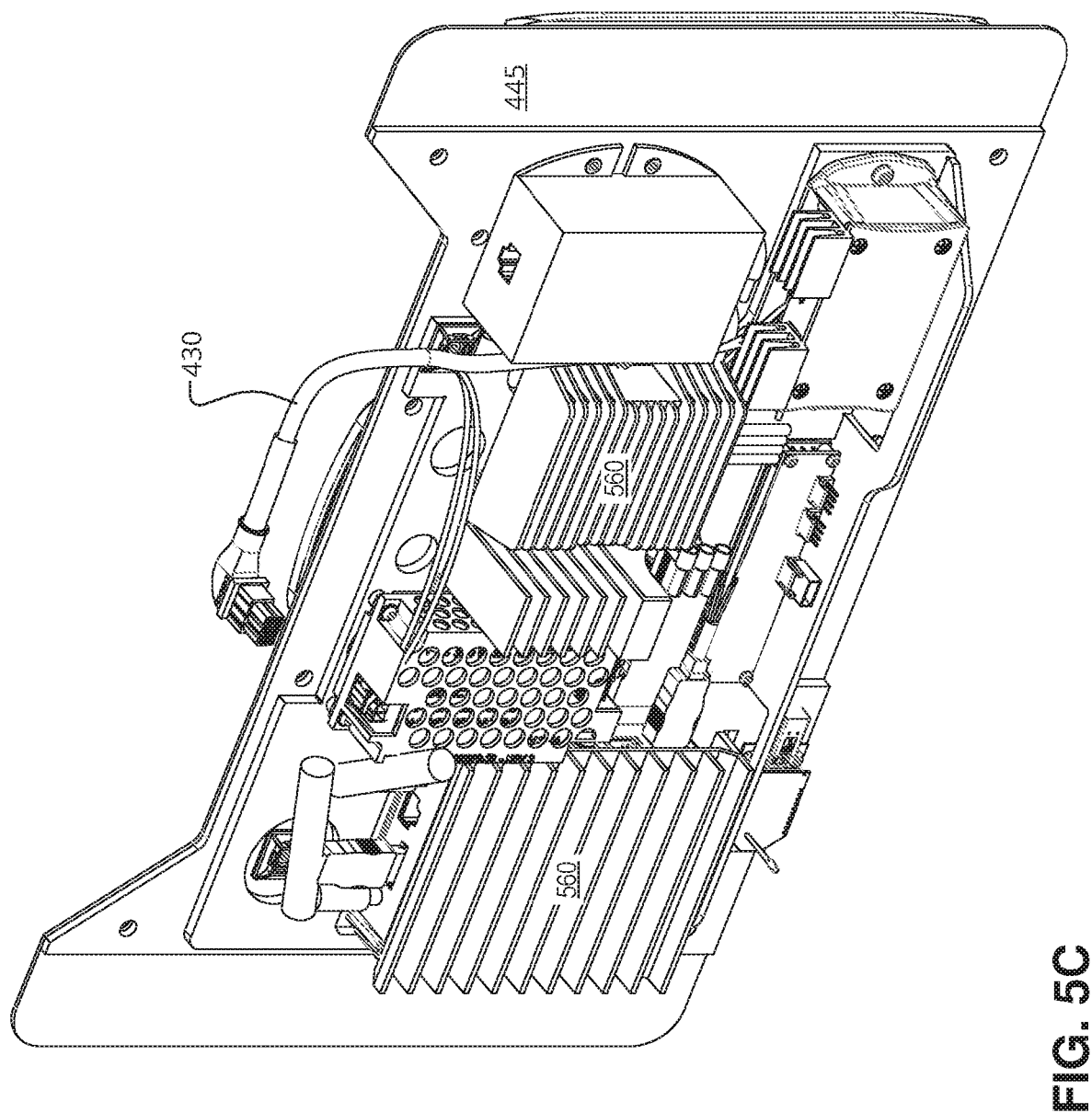
FIG. 5C is a perspective view illustration of an underside of the carriage lid and topside internal components, in accordance with an embodiment of the disclosure.
Figure 5D:
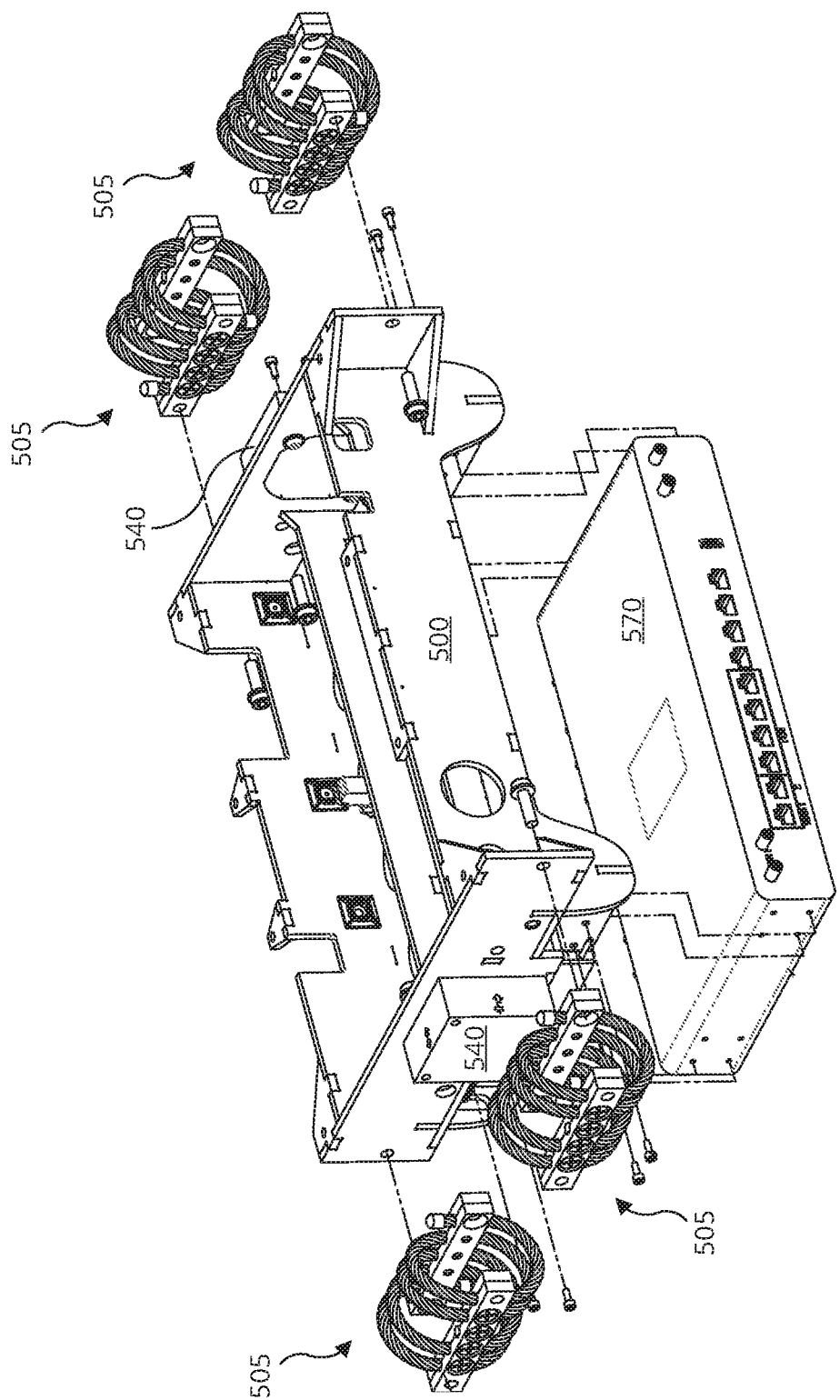
FIG. 5D is an exploded perspective view illustration of bottom side internal components mounted to the internal chassis, in accordance with an embodiment of the disclosure.

FIGS. 5A-D illustrate different views of an internal chassis 500 and shock isolators 505 for mounting and protecting the internal components of a PAVCP, in accordance with an embodiment of the disclosure. FIG. 5A is a perspective view illustration of internal chassis 500, FIG. 5B is an exploded perspective view illustration of top side internal components mounted to internal chassis 500, FIG. 5C is a perspective view illustration of an underside of carriage lid 445 and the topside internal components, while FIG. 5D is an exploded perspective view illustration of bottom side internal components mounted to internal chassis 500, all in accordance with an embodiment of the disclosure. Internal chassis 500 is one possible implementation of internal chassis 135 while shock isolators 505 are one possible implementation of shock isolators 140.

Referring to FIG. 5A, internal chassis 500 provides a support or carriage to which the internal components of PAVCP are mounted along both the upper and lower sides in a sandwiching configuration (see FIGS. 5B and 5D). This sandwiching configuration along with interior rails 515 of internal chassis 500 define a cooling cavity 510 extending through a central portion of the chassis. Vent cutouts 520 are disposed at either ends of cool cavity 510 and align with vents 460 on portable case 410 (see FIG. 4B). Cutouts 530 reduce the overall weight of internal chassis 500. In one embodiment, internal chassis 500 is fabricated of a bonded lightweight polycarbonate material and is assembled with snap fit, tongue and groove joints 535 so that special adhesive fixtures are not necessary.

Referring to FIGS. 5B and 5D, the illustrated embodiment includes shock isolators 505 disposed at the four corner regions of internal chassis 500 and serve to suspend internal chassis 500 along with the internal components within portable case 410 of a PAVCP. FIG. 5D illustrates a demonstrative gateway router 570 mounted to an underside of internal chassis 500. In the illustrated embodiment, shock isolators 505 are implemented as wire rope isolators that flex to provide mechanical shock absorption. In one embodiment, shock isolators 505 are preloaded under compression between the inside surface of portable case 410 and internal chassis 500. Preloading can provide more uniform suspension travel in tension and compression for a given sized isolator. Of course, other types, configurations, and mounting positions for shock isolators 505 may be implemented.

Suspension of internal chassis 500 provides greater mechanical shock absorption and suspension travel relative to foam padding for a given interior volume of portable case 410. Furthermore, suspension of interior chassis 500 permits air flow around the internal components for improved convection cooling relative to foam padding. In the illustrated embodiment, fans 540 are disposed at opposing distal ends of cooling cavity 510, with one orientated to push air into cooling cavity 510 and the other oriented to evacuate air from cooling cavity 510. Of course, other configurations may be implemented. In one embodiment, a thermostat is provided internal to portable case 410 to provide self-regulated temperature control feedback to fans 540.

FIG. 5C illustrates the underside of carriage lid 445, which mounts over the topside of internal chassis 500. As illustrated, a number of heat sinks 560 are mounted to the underside side of carriage lid 445 and serve to draw heat away from thermally connected internal components. When carriage lid 445 is mounted onto internal chassis 500, heat sinks 560 extend into cooling cavity 510 to provide convection cooling via the air pushed through cooling cavity 510.

FIGS. 5B and 5C further illustrate how internal components are electrically coupled to external ports 435 via flexible cables 430. No rigid connections that would impede the suspension travel of shock isolators 505 are established between the internal chassis 500, or internal components mounted thereto, and portable case 410.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A portable autonomous vehicle connectivity platform, comprising:
    a portable case;
    one or more local area network (LAN) side adapters disposed within the portable case and configured to communicate with one or more local devices including an autonomous vehicle (AV), wherein the one or more LAN side adapters includes a wireless LAN adapter and a powered wired LAN adapter;
    one or more wide area network (WAN) side adapters disposed within the portable case and configured to communicate with one or more remote servers, wherein the one or more WAN side adapters includes a plurality of cellular modems;
    a gateway router disposed within the portable case for bridging communications between the one or more LAN side adapters and the one or more WAN side adapters; and
    a controller including a processor and local storage coupled to the gateway router, wherein the local storage stores instructions that, when executed by the processor, causes the portable autonomous vehicle connectivity platform to perform operations including:
        receiving a mission log report from the AV over the one or more LAN side adapters after the AV returns from a mission;
        caching the mission log report in the local storage; and
        transmitting the mission log report from the local storage to the one or more remote servers over the one or more WAN side adapters.

2. The portable autonomous vehicle connectivity platform of claim 1, wherein the AV comprises one of a plurality of unmanned aerial vehicles (UAVs), and wherein the local storage stores further instructions that, when executed by the processor, causes the portable autonomous vehicle connectivity platform to perform further operations including:
    receiving a plurality of mission log reports from the UAVs over the wireless LAN adapter;
    caching the mission log reports in the local storage upon return of the UAVs after flying missions;
    aggregating a bandwidth of the plurality of cellular modems; and
    transmitting the mission log reports to the one or more remote servers over the cellular modems.

3. The portable autonomous vehicle connectivity platform of claim 2, wherein the local storage stores further instructions that, when executed by the processor, causes the portable autonomous vehicle connectivity platform to perform further operations including:
    generating analytics data measuring one or more of an accumulation rate of the mission log reports, a storage occupancy of the mission log reports, or an offload rate of the mission log reports; and
    reporting the analytics data over the WAN side adapters to one of the remote servers.

4. The portable autonomous vehicle connectivity platform of claim 1, wherein the one or more LAN side adapters further includes an additional wireless adapter having a lower power consumption and a lower bandwidth than the wireless LAN adapter for wirelessly coupling to a local weather station.

5. The portable autonomous vehicle connectivity platform of claim 1, wherein the local storage stores further instructions that, when executed by the processor, causes the portable autonomous vehicle connectivity platform to perform further operations including:
    receiving mission planning data describing a new mission route for the AV over the one or more WAN side adapters from one of the remote servers; and
    transferring the mission planning data to the AV upon establishing a communication session with the AV via the one or more LAN side adapters.

6. The portable autonomous vehicle connectivity platform of claim 1, wherein the local storage stores further instructions that, when executed by the processor, causes the portable autonomous vehicle connectivity platform to perform further operations including:
    establishing a remote management connection between a remote terminal and the AV via the portable autonomous vehicle connectivity platform; and
    conveying real-time configuration commands and response confirmations between the AV and the remote terminal over an encrypted communication session between the AV and the remote terminal.

7. The portable autonomous vehicle connectivity platform of claim 1, wherein the portable case comprises a ruggedized, weather-resistant case with a lid.

8. The portable autonomous vehicle connectivity platform of claim 1, further comprising:
    a power adapter disposed within the portable case and coupled to power the one or more LAN side adapters, the one or more WAN side adapters, the gateway router, and the controller, wherein the power adapter includes alternating current (AC) and direct current (DC) power regulators for powering internal components of the portable autonomous vehicle connectivity platform from external sources of either AC power or DC power.

9. The portable autonomous vehicle connectivity platform of claim 1, further comprising:
an internal chassis disposed within the portable case and to which internal components including the one or more LAN side adapters, the one or more WAN side adapters, the gateway router, and the controller are mounted; and
shock isolators mounted to inside surfaces of the portable case and mechanically coupled to the internal chassis to suspend the internal chassis within the portable case.

10. The portable autonomous vehicle connectivity platform of claim 9, wherein the shock isolators comprise four instances of the shock isolators each coupling a respective corner region of the internal chassis to one of the inside surfaces of the portable case.

11. The portable autonomous vehicle connectivity platform of claim 9, wherein the shock isolators are preloaded under compression between the inside surfaces and the internal chassis.

12. The portable autonomous vehicle connectivity platform of claim 9, wherein the portable autonomous vehicle connectivity platform includes no rigid connections between the internal components and the portable case and wherein all power or communication connections between external ports on the portable case and the internal components are connected via flexible cables.

13. The portable autonomous vehicle connectivity platform of claim 9, wherein the internal chassis includes a cooling cavity extending through a central portion of the internal chassis and aligned with vents disposed in the portable case, and wherein the internal components are mounted to top and bottom sides of the internal chassis sandwiching both sides of the cooling cavity with one or more heat sinks extending into the cooling cavity.

14. A portable autonomous vehicle connectivity platform, comprising:
a portable case;
a local area network (LAN) side adapter disposed within the portable case for communicating with unmanned aerial vehicles (UAVs);
a wide area network (WAN) side adapter disposed within the portable case for communicating with a remote server;
a gateway router disposed within the portable case and coupled to bridge communications between the LAN side adapter and the WAN side adapter; and
a controller coupled to the gateway router, wherein the controller includes a processor and local storage, and wherein the local storage stores instructions that, when executed by the processor, causes the portable autonomous vehicle connectivity platform to perform operations including:
receiving data from the UAVs over the LAN side adapter;
caching the data in the local storage upon return of the UAVs after flying missions;
aggregating a bandwidth of a plurality of WAN side adapters including the WAN side adapter; and
transmitting the data to the remote server over the WAN side adapters.

15. The portable autonomous vehicle connectivity platform of claim 14, wherein the data comprises one or more mission log reports.

16. The portable autonomous vehicle connectivity platform of claim 15, wherein the local storage stores further instructions that, when executed by the processor, causes the portable autonomous vehicle connectivity platform to perform further operations including:
generating analytics data measuring one or more of an accumulation rate of the mission log reports, a storage occupancy of the mission log reports, or an offload rate of the mission log reports; and
reporting the analytics data over one or more of the WAN side adapters.

17. The portable autonomous vehicle connectivity platform of claim 15, wherein the local storage stores further instructions that, when executed by the processor, causes the portable autonomous vehicle connectivity platform to perform further operations including:
receiving an over-the-air (OTA) software update for the UAVs over one or more of the WAN side adapters;
caching the OTA software update in the local storage; and
transmitting the OTA software update from the local storage to the UAVs over the LAN side adapter.

18. The portable autonomous vehicle connectivity platform of claim 14, wherein the local storage stores further instructions that, when executed by the processor, causes the portable autonomous vehicle connectivity platform to perform further operations including:
receiving mission planning data describing a new mission route for one of the UAVs over the WAN side adapter; and
transferring the mission planning data to the one of the UAVs via the LAN side adapter.

19. A portable autonomous vehicle connectivity platform, comprising:
a portable case;
a local area network (LAN) side adapter disposed within the portable case for communicating with unmanned aerial vehicles (UAVs);
a wide area network (WAN) side adapter disposed within the portable case for communicating with a remote server;
a gateway router disposed within the portable case and coupled to bridge communications between the LAN side adapter and the WAN side adapter;
a controller coupled to the gateway router for caching data from the UAVs and transmitting the data to the remote server;
an internal chassis disposed within the portable case and to which internal components including the LAN side adapter, the WAN side adapter, the gateway router, and the controller are mounted; and
shock isolators mounted to inside surfaces of the portable case and coupled to the internal chassis to suspend the internal chassis within the portable case.

20. The portable autonomous vehicle connectivity platform of claim 19, wherein the shock isolators are preloaded under compression between the inside surfaces and the internal chassis.

21. The portable autonomous vehicle connectivity platform of claim 19, wherein the portable autonomous vehicle connectivity platform includes no rigid connections between the internal components and the portable case and wherein all power or communication connections between external ports on the portable case and the internal components are connected via flexible cables.

22. The portable autonomous vehicle connectivity platform of claim 19, wherein the internal chassis includes a cooling cavity extending through a central portion of the internal chassis and aligned with vents disposed in the portable case, and wherein the internal components are mounted to top and bottom sides of the internal chassis sandwiching both sides of the cooling cavity with one or more heat sinks extending into the cooling cavity.

23. A portable autonomous vehicle connectivity platform, comprising:
   a portable case;
   one or more local area network (LAN) side adapters disposed within the portable case and configured to communicate with one or more local devices including an autonomous vehicle (AV);
   one or more wide area network (WAN) side adapters disposed within the portable case and configured to communicate with one or more remote servers;
   a gateway router disposed within the portable case for bridging communications between the one or more LAN side adapters and the one or more WAN side adapters; and
   a controller including a processor and local storage coupled to the gateway router, wherein the local storage stores instructions that, when executed by the processor, causes the portable autonomous vehicle connectivity platform to perform operations including:
      establishing a remote management connection between a remote terminal and the AV via the portable autonomous vehicle connectivity platform; and
      conveying real-time configuration commands and response confirmations between the AV and the remote terminal over an encrypted communication session between the AV and the remote terminal.

* * * * *